(12) United States Patent
Dikovsky et al.

(10) Patent No.: US 8,470,231 B1
(45) Date of Patent: Jun. 25, 2013

(54) THREE-DIMENSIONAL PRINTING PROCESS FOR PRODUCING A SELF-DESTRUCTIBLE TEMPORARY STRUCTURE

(75) Inventors: Daniel Dikovsky, Rehovot (IL); Eduardo Napadensky, Netanya (IL)

(73) Assignee: Stratasys Ltd., Rehovot (IL)

( * ) Notice: Subject to any disclaimer, the term of this patent is extended or adjusted under 35 U.S.C. 154(b) by 282 days.

(21) Appl. No.: 12/791,433

(22) Filed: Jun. 1, 2010

Related U.S. Application Data

(60) Provisional application No. 61/182,778, filed on Jun. 1, 2009.

(51) Int. Cl.
*B29C 33/52* (2006.01)
*B29C 41/02* (2006.01)

(52) U.S. Cl.
USPC .......................................... 264/308; 264/317

(58) Field of Classification Search
USPC .......................................... 264/221, 308, 317
See application file for complete search history.

(56) References Cited

U.S. PATENT DOCUMENTS

| 2005/0173045 A1* | 8/2005 | Hayes | 156/73.6 |
| 2008/0111282 A1* | 5/2008 | Xie et al. | 264/401 |
| 2010/0145469 A1* | 6/2010 | Barralet et al. | 623/23.56 |

* cited by examiner

*Primary Examiner* — Leo B Tentoni
(74) *Attorney, Agent, or Firm* — Pearl Cohen Zedek Latzer, LLP

(57) ABSTRACT

The invention relates to additive manufacturing (AM) and in particular to a degradable material for use in applications that require temporary structure stability, such as in investment casting or biomedical applications or as a temporary support material.

20 Claims, 11 Drawing Sheets

THREE-DIMENSIONAL PRINTING PROCESS FOR PRODUCING A SELF-DESTRUCTIBLE TEMPORARY STRUCTURE

CROSS REFERENCE TO RELATED APPLICATIONS

This application claims priority of U.S. Provisional Patent Application No. 61/182,778, filed Jun. 1, 2009.

FIELD OF THE INVENTION

The invention relates to additive manufacturing (AM) and in particular to a degradable material for use in applications that require temporary structure stability, such as in investment casting or biomedical applications or as a temporary support material.

BACKGROUND OF THE INVENTION

AM is generally a process in which three-dimensional (3D) objects are constructed utilizing a computer model of the objects. These processes are used in various fields, such as design related fields for purposes of visualization, demonstration and mechanical prototyping.

Various techniques of AM exist, one such technique, otherwise known as 3D printing, being performed by a layer by layer inkjet deposition of building materials. Depending on the building materials, the layers are then cured or solidified. The building materials may include modeling materials and support materials, which form the object and the temporary support constructions supporting the object as it is being built. In cases where objects include overhanging features or shapes, e.g. curved geometries, negative angles, voids, and so on, objects are typically constructed using adjacent support constructions, which are used during the printing and then subsequently removed in order to reveal the final shape of the fabricated object.

During the AM process, at least one material ("object material" or "modeling material") is deposited to produce the desired object and at least one other material ("support material") to provide support for specific areas of the object during building and assure adequate vertical placement of subsequent object layers. Both materials, modeling material and support material might be initially liquid and are subsequently hardened to form the required layer shape. The hardening process may be performed by a variety of methods, such as UV curing, phase change, crystallization, drying, etc. In all cases, the support material is deposited in proximity of the object layers and often forms complex geometries and fills object voids.

In such cases, the removal of the support structure is difficult and time consuming, and may damage the formed object.

Examples of materials used as support materials are soluble materials and phase change materials.

Soluble support materials are especially appropriate for supporting small parts, because large masses of soluble material may require long period of time for dissolving.

To diminish such problems, the fabricated object is often immersed in water or in a solvent that is capable of dissolving the support materials. In many cases, however, the cleaning process may involve toxic materials, manual labor and special equipment requiring trained personnel, protective clothing and expensive waste disposal. In addition, the dissolving process is usually limited by diffusion kinetics and may require very long periods of time, especially when the support constructions are large and bulky.

Other examples of support material presently used in some AM techniques are phase change materials. These, at an appropriately high temperature, melt and thus permit support removal in the liquid state. One of the drawbacks of the phase change is that the temperature required for melting the support material tends to cause deformation of the model structure.

Another example of an application that requires materials that can be easily removed is investment casting. In investment casting these materials are used for mold preparation and then removed, usually by melting, evaporation or burning in order to allow casting of another material, for example a metal.

In addition, in biomedical applications it would be beneficial to be able to produce temporary objects which are destructible or degradable, for use, for example, as temporary implants or drug delivery devices.

It would therefore be advantageous to have a material and process for AM manufacturing enabling easy, inexpensive, fast and convenient formation of self destructible objects.

SUMMARY OF THE INVENTION

This invention is directed to a combination of a degradable material solution that comprises a degradable component and may comprise other agents, and a disintegrating agent solution that comprises a disintegrating agent and may comprise other agents, for a three dimensional printing process, wherein the degradable material solution may be combined with the disintegrating agent solution before, during or after material deposition in the three dimensional printing process.

This invention is further directed to an embodiment, wherein the degradable component is degraded by the disintegrating agent after the degradable material solution is hardened or solidified. Further, this invention is directed to a self degradable material produced by 3D printing, wherein the degradable material comprises a degradable component and a disintegrating agent, where the degradable component and the disintegrating agent are combined and wherein the degradable component is a molecular structural element, which is chemically disassembled by the disintegrating agent.

According to the present invention, the degradable component may be a copolymer, a block-copolymer, a photopolymer, a polysaccharide, reactive polymer-protein hybrid molecules, a biosynthetic hydrogel material or a wax.

According to some embodiments, the copolymer contains polyethyleneglycol (PEG), poly(acrylic acid), poly(hyaluronic acid), polycaprolactone or poly(vinyl alcohol).

According to further embodiments, the disintegrating agent is an enzyme, an acid, a base or a catalyst. Additionally, the enzyme may be an esterase, such as a lipase, a cellulase, or a dextranase.

According to some embodiments of this invention, the disintegrating agent is in an isolated state, for example, is inactive or is encapsulated.

According to further embodiments, the degradable material solution and the disintegrating agent solution may further comprise any one of a reactive solvent, a non-reactive solvent, a surfactant, a photoinitiator, a viscosity modifier, a rheology modifier or any combination thereof.

According to one embodiment, the degradable component is degraded by the disintegrating agent within one to 72 hours.

According to some embodiments, the combination of the degradable material solution and the disintegrating agent solution is controlled by a dedicated software so that the volume ratio of the degradable material solution and the disintegrating agent solution can be modulated during the three dimensional printing process.

According to certain embodiments, the disintegrating agent solution comprises a solvent that is incompatible with a solvent included in the degradable material solution. According to further embodiments, the disintegrating agent solution is polymerized and releases the disintegrating agent by diffusion.

This invention further relates to a method for preparing a combination of a degradable material solution that comprises a degradable component, and a disintegrating agent solution that comprises a disintegrating agent, for a three dimensional printing process, said method comprising: providing the degradable material solution; providing the disintegrating agent solution; and combining said degradable material solution and said disintegrating agent solution; wherein after the degradable material hardens it is degraded by the disintegrating agent.

According to certain embodiments, the degradable material solution and the disintegrating agent solution are combined in a mixing chamber before jetting in the three dimensional printing process.

According to further embodiments, the degradable material solution and the disintegrating agent solution are combined during the three dimensional printing process by combining the degradable material solution and the disintegrating agent solution on a printing tray or surface upon which a three dimensional pattern is being printed.

The invention is further directed to embodiments wherein the degradable material solution and the disintegrating agent solution are combined after jetting in the three dimensional printing process.

According to certain embodiments of the invention the disintegrating agent is in an isolated state and the disintegrating agent is released and/or activated during or after the three dimensional printing process by an external trigger.

According to certain embodiments, the volume ratio of the degradable material solution and the disintegrating agent solution is determined by a dedicated software.

According to further embodiments, a dedicated software together with a dedicated automated pump system and an appropriate mixing chamber dynamically produce a homogeneous mixture of the degradable material solution with between 0.01% (v/v) and 10% (v/v) of the disintegrating agent solution, which is delivered from a cartridge and mixed with the degradable material solution in the mixing chamber before jetting.

BRIEF DESCRIPTION OF THE DRAWINGS

As shown in FIG. 1, computer (8) regulates the deposition of degradable material solution (3) and the disintegrating agent solution (4) from cartridges (7);

As shown in FIG. 1, computer (8) regulates the pumping of degradable material solution (3) and the disintegrating agent solution (4) from cartridges (7) via pumps (5) and (6) into mixing chamber (11);

DESCRIPTION OF THE INVENTION

Figure 1:
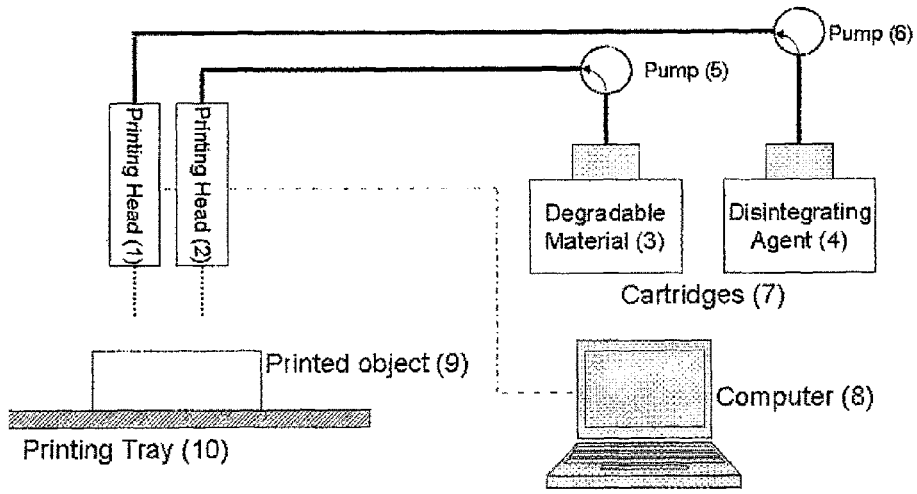
FIG. 1: schematically describes a system wherein the degradable material solution (3) and the disintegrating agent solution (4), found initially in cartridges (7) and pumped therefrom via pumps (5) and (6), are mixed on the printing tray (10) after deposition from printing heads (1) and (2), thereby preparing the printed object (9).

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention. It is to be understood that the phraseology and terminology employed herein is for the purpose of description and should not be regarded as limiting.

The invention relates to additive manufacturing (AM) in general, and in particular to degradable materials for use in AM, for example, for providing a temporary support structure for supporting 3D objects during the 3D building process, or otherwise as a building material in applications that require temporary structures, such as investment casting or biomedical applications, such as, temporary implants and drug delivery devices.

Additive manufacturing systems (AMS) and processes thereof generally fabricate 3D objects in a layer-wise manner by forming a plurality of layers in a configured pattern corresponding to the shape of the objects.

Each layer is formed by an AMS such as a 3D printing apparatus, which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto, e.g. modeling material or support material. The decision is made according to a computer image of the surface.

The apparatus deposits, e.g. jets via inkjet printing head, building materials in target locations which are to be occupied and leaves other target locations void. The apparatus typically includes a plurality of dispensing heads, each of which can be configured to dispense a different building material. Thus, different target locations can be occupied by different building materials.

The types of building materials can be categorized into two major categories: modeling material and support material. The modeling material is generally a composition which is formulated for use in AM to form a 3D object. The support material serves to provide a support structure for supporting the object e.g. overhanging object parts during the fabricating process and/or other purposes, e.g., filling voids, to provide hollow or porous objects.

Generation of the 3D support structure is performed according to the geometry of the object in question, using designated software algorithms well known in the art.

While a soluble material is physically dissolved in a dissolving medium without any chemical reaction taking place, the degradable material described in this invention, undergoes a chemical reaction, which allows a dissolving process to take place. Furthermore, the degradable material of this invention undergoes degradation by means of reaction between components in the degradable material, which change the chemical nature of the material by means of chemical bond cleavage. The term "chemical bond" as used herein relates to covalent bonds, ionic bonds, hydrogen bonds and Van der Waals bonds.

The terms "degradable material solution" or "material solution" as used herein relate to a solution for use in AM process that comprises at least one degradable component, which may be degraded by the means detailed herein. Further, the solution may include additional components, as detailed herein below. The material solution, in some embodiments of the invention, detailed below, may comprise a disintegrating agent.

The term "disintegration agent solution" used herein relates to a solution comprising a disintegrating agent, such as, without limitation, an enzyme, an acid, a base or a catalyst responsible for the self degradation of the self degradable material, which is also termed here degradable material, of this invention. Further, the disintegrating agent solution may include additional components, as detailed herein below.

The terms "degradable support material" or "support material" used herein relate to any self degradable material produced via AM process and used as a support material.

An embodiment of the present invention is directed to a self degradable material produced by 3D printing by combining a degradable material solution and a disintegration agent solution before, during or after deposition of the solutions containing them. The degradable material combination thus produced comprises a degradable component and a disintegrating agent. The degradable component is a molecular structural element, which is chemically disassembled by the disintegrating agent, as or after they come into contact in the degradable material.

In an embodiment of the invention, the invention provides a material solution, comprising a degradable component for producing a support material during a layer-by-layer AM process or for making a mold for use e.g. in investment casting. In an embodiment of the invention, the material solution is deposited in liquid form, layer by layer, to form a desired geometry of a support construction or mold. Following the deposition of each layer, the material solution is hardened, cured or solidified, and the deposition-hardening sequence is repeated as needed until the target structure is completed.

The degradable material may comprise any type of degradable component and may easily be removed from an object, for example by mechanical, chemical, thermal or a combination of such means. The material providing the structure, e.g. a support structure, must be capable of providing the required steadiness and firmness to hold layers or parts of layers of an object being prepared using the modeling material.

In an embodiment of the invention, the materials forming the degradable material or support are in a liquid form before deposition, both at room temperature and at jetting temperature, which is a higher temperature than room temperature and is, in an embodiment of the invention, in the range of 40° C.-75° C. and in another embodiment, is about 40° C. The degradable material or support material is hardened or solidifies to becomes solid, semi-solid or a form of gel after deposition, for example by UV irradiation.

In an embodiment of the invention, the degradable component is a copolymer, which is disintegrated in a predictable timely manner, by contacting the copolymer with a disintegrating agent.

In an embodiment of the invention, the disintegrating agent or the disintegrating agent solution gradually degrades the degradable component, so that the structure of the self degradable material turns into a liquid, a weak gel or small solid or gel particles, which are then easily separable from the fabricated object, once the disintegrating process comes into effect.

In an embodiment of the invention, the degradable component is a copolymer, which has at least one hydrophilic domain and at least one hydrophobic domain (amphiphilic copolymer) containing at least one type of target region that can be cleaved in the presence of any appropriate active substance such as a disintegrating agent. Using amphiphilic copolymers may be desirable, because enzymes require a hydrophilic aqueous environment to maintain their activity, while usually degrading hydrophobic molecular sequences. The amphiphilic copolymers allow solubilizing hydrophobic molecular regions in aqueous systems and create an environment that permits the processes of enzymatic cleavage and degradation.

According to one embodiment of the invention, the copolymer is a block copolymer. Non limiting examples for copolymer components are poly(ethyleneglycol) (PEG), poly (acrylic acid), poly(hyaluronic acid), poly(caprolactone) or poly(vinyl alcohol), dextran, cellulose, starch or alginate.

The disintegrating agent may be an enzyme that is able to cleave certain bonds in the degradable component, thereby causing it to turn to liquid, gel or small solid or gel particles that are easily removed from the printed object material. Non-limiting examples of disintegrating agents include enzymes such as esterase, which may cleave ester bonds in the copolymer, cellulase, for cleaving cellulose bonds or dextranase for cleaving dextran bonds. In some embodiments, the esterase may be a lipase. In an embodiment of the invention, the disintegrating agent is an acid, such as chloric acid, perchloric acid, citric acid, formic acid, nitric acid, phosphoric acid or sulfuric acid. In an embodiment of the invention, the disintegrating agent is a base, such as sodium hydroxide, potassium hydroxide, barium hydroxide or magnesium hydroxide.

In an alternative embodiment of the invention, the disintegrating agent may be combined within the modeling material forming the object. The material comprising a degradable component forms a support construction, optionally with a modeling material grid within said support construction adjacent to the object. When printing is complete, the disintegrating agent is released into the adjacent support material and degrades the degradable component, but not the modeling material, thereby weakening the support construction, at the interface between the model material and support material enabling easy removal of the support construction.

The disintegrating agent solution may be contacted with the degradable component, according to some embodiments of the invention, at different stages of the process, i.e. before the jetting (i.e. deposition), during the jetting or after the jetting.

Reference is now made to FIG. 1, according to which in one embodiment, the disintegrating agent solution (4) may be contacted with the degradable material (3) during the fabrication or printing process, wherein each material enters and is deposited by a different printing head (1 and 2) and come into contact, e.g. are combined within a layer, on the printing tray (10) or printing surface upon which the patterned layers are being printed, e.g. the uppermost layer or surface of the object being printed (printed object (9)).

Figure 2:
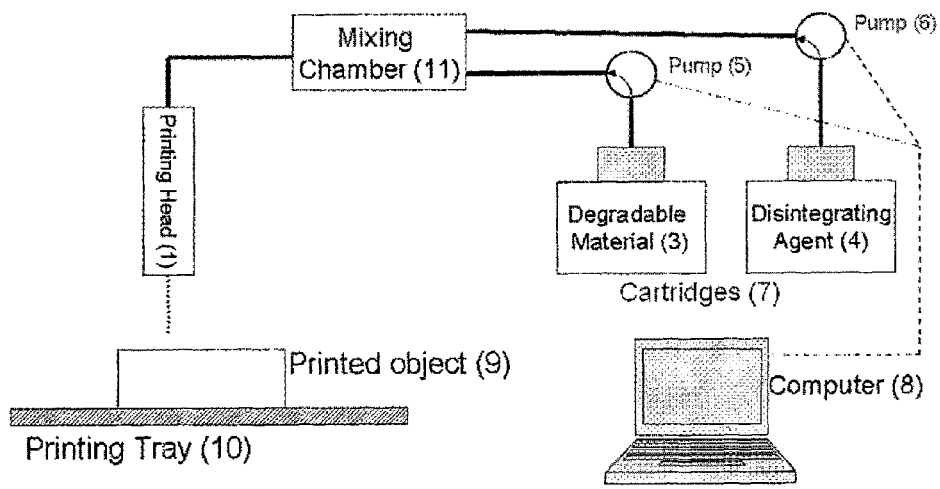
FIG. 2: schematically describes a system wherein the degradable material solution (3) and the disintegrating agent solution (4), found initially in cartridges (7) and pumped therefrom via pumps (5) and (6), are mixed in a dedicated mixing chamber (11) immediately before entering the printing head (1) for deposition, thereby preparing the printed object (9) on printing tray (10).

Reference is now made to FIG. 2, according to which in another embodiment of the invention, the disintegrating agent solution (4) may be contacted with the degradable material (3) a number of minutes or seconds before entering the printing head (1).

Figure 3:
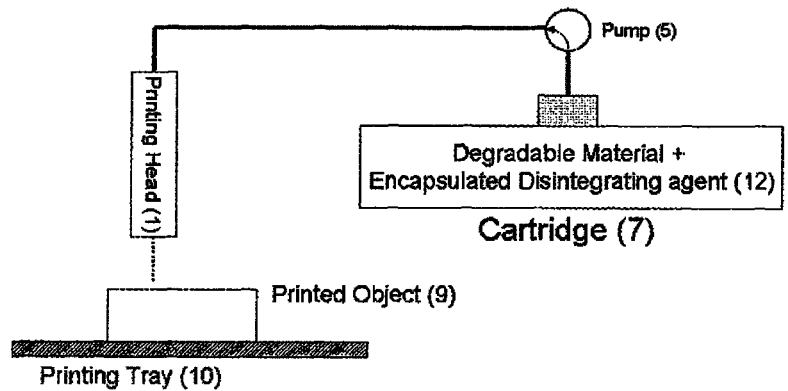
FIG. 3: schematically describes a system wherein the degradable material solution together with the encapsulated disintegrating agent (12) are mixed within the cartridge (7). They are then pumped via pump (5) from cartridge (7) to printing head (1), wherefrom they are deposited on printing tray (10), thereby preparing printed object (9)

Reference is further made to FIG. 3, according to which in another embodiment, the disintegrating agent (4) may be included in the cartridge (7) together with the degradable material (3) in an isolated state such as for example, encapsulated or in an inactive form, and the combined material deposited together via printing head (1) onto printing tray (10) or uppermost surface of printed object (9). The disintegrating agent (4) may be activated or released during the printing process or after printing is complete by an external trigger, such as, for example, without limitation, heat, microwave radiation or ultrasound.

If necessary, the degradable component may be dissolved in appropriate solvents in order to prepare a jetting-compatible formulation. In some embodiments, non reactive solvents such as, for example, without limitation, water or alcohol, polyols or PEG, may be used. When such non-reactive solvents are used the concentration and the properties of the degradable component should be such to produce a material having the required stiffness for acting for fulfilling the desirable application, i.e., sufficient stiffness for building a support material according to this invention. If reactive solvents, such as acryloyl morpholine (ACMO) are included in the degradable material, the degradable component concentration used can be lower. However, the addition of reactive ingredients, such as reactive diluents, that are not sensitive to the disintegrating agent can delay or even prevent the desirable decomposition of the self degradable material. Therefore reactive ingredients, such as reactive diluents, should be added in appropriate concentrations.

In an exemplary embodiment of the invention, there is provided a degradable component such as a block co-polymer composed of Poly(ethylene glycol) (PEG) and poly(caprolactone) (PCL) domains, which contains photo-polymerizable functional groups (difunctional), such as acrylates or methacrylates. The use of monofunctional polymers is possible but considered less effective, because they will not contribute to the network cross link density. The backbone of the polymer created, for example, by the reaction of acrylic functional groups will usually not be cleaved by the disintegrating agent. In an embodiment of the invention, these molecules may be dissolved in organic (non-polar) and/or in aqueous (polar) solvents, depending on the specific PEG/PCL ratio, and then photopolymerized to form a solid or a gel. The PCL domain contains ester bonds that can be cleaved by hydrolysis in a basic environment or by an appropriate enzyme, usually esterase, even in a neutral pH, wherein the base or the enzyme act as the disintegrating agent according to this invention. Cleaving the ester bonds inside the cross-linked hydrogel results in decreasing the stiffness of the solid or gel material and/or its conversion into liquid, so that the material is easily removed. According to some embodiments, the disintegrating agent is added to the copolymer shortly before the polymerization and initiates gradual degradation of the formed degradable material.

Figure 6:
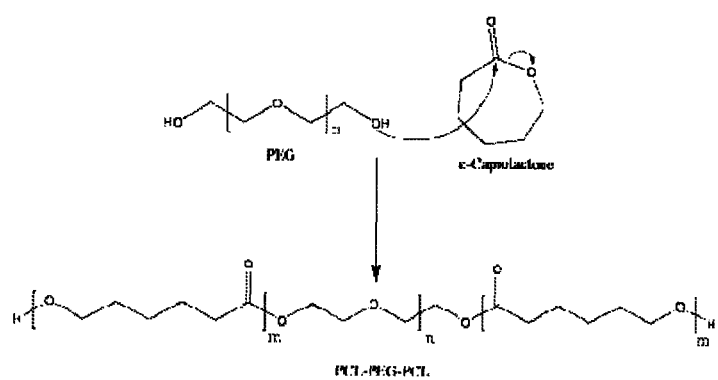
FIG. 6: demonstrates the synthesis of triblock polymers PCL-PEG-PCL from PEGs of various lengths and E-Caprolactone, in the presence of Stannous 2-Ethyl-Hexanoate.

Specifically, in an embodiment of the invention, a PCL750-PEG 1500-PCL750 tri-block copolymer is synthesized from PEG 1500 gr/mol of various lengths and c-Caprolactone as described in FIG. 6, in the presence of Stannous 2-Ethyl-Hexanoate, using any appropriate procedure known in the art. The tri-block copolymer is functionalized with acrylates to result in tri-block di-acrylate molecules. These molecules are then dissolved in a mixture of water and benzyl alcohol to receive a 25% (w/v) tri-block copolymer solution, acting as the degradable material solution according to this invention.

The viscosities of the degradable material solution should be in the range that is suitable for ink-jetting, namely, under 30 cP, or under certain embodiments, between 10 cP and 20 cP at jetting temperatures between about 25° C. to 80° C. A 0.1% to 0.3% of a surfactant, for example BYK 345, may be added to the degradable material solution to adjust the surface tension of the formulation to 25 mN/m-35 mN/m in order to allow its implementation in ink-jet systems. Between 0.5% to 3% of photoinitiator, for example, Irgacure 2959 (Ciba), may be added to the degradable material solution to allow the photopolymerization of the triblock copolymers. Polymerized hydrogel having compressive modulus between 100 KPa and 1000 KPa may be produced, appropriate for use as for example support material or degradable material. Generally, the viscosity of the solutions may be measured by any means known in the art, including shear rheometry or viscometry. In some embodiments a support material or degradable material were produced. Such support material or degradable material having overall, physical properties, jetting behavior, polymerization kinetics and gel properties comparable to those of a conventional support material that is currently used in Objet printers, e.g. FullCure® 705.

According to one embodiment, and as exemplified in example 4, the polymerized hydrogel, which is the degradable material according to this invention, is converted into liquid when exposed to a solution of *Pseudomonas* lipase having a concentration of at least 1 mg/ml.

In an embodiment of the invention, a disintegrating agent solution containing 1-5 mg/ml of *Pseudomonas* lipase in a solvent containing 30%-70% water, 10-30% Glycerol, 0-40% PEG400 and 0.05-0.3% BYK 345, is prepared. This solution may be deposited together (in parallel) with the degradable material solution as a designated 'combined material' or "Digital Material" (DM) using for example a multi-material 3D printer such as Connex™ 500 system (Objet Geometries Ltd.). 3D printing of multiple materials, using for example Connex™ 500 system, allows the design of materials at the voxel level, where for example a degradable material solution and a disintegrating solution may be digitally combined, meaning that a software file will describe the material structure at the voxel level. For example, according to this embodiment, a degradable material containing small regions for example, of inclusions of disintegrating agent may be designed. Such combined material comprises a continuous phase of degradable material made, e.g. of a support material with, for example, small regions of between 0.03×0.03×0.03 mm and 0.5×0.5×0.5 mm of disintegrating agent, disseminated into the degradable material at a level of for example between 0.01% disintegrating agent or 0.1% or 1% or 10% or any concentration of the disintegrating agent solution according to the intended use and required properties of the resulting degradable material, e.g. rate of degradation. In an exemplary embodiment, phases, e.g. regions made of the disintegrating agent solution, may be distanced from one another within the continuous degradable material phase, such that the distance between the phases is kept, for example, below one cm in each direction and the overall volumetric ratio of the disintegrating agent solution is between 0.01% and 10%. The printing of such DM using the standard Connex process may result in hydrogel layers that are converted into liquid after between 1 hour and 72 hours following the deposition. A dedicated software is used to calculate the volume ratio of the disintegrating agent solution in order to provide the desirable decomposition kinetics.

In another embodiment, the disintegrating agent solution is delivered to the printing apparatus from a cartridge and mixed or combined with the degradable material solution before jetting, just before entering the inkjet printing heads of the apparatus. Dedicated software together with a dedicated automated pump system and an appropriate mixing chamber, e.g. in proximity of the printing heads, are used to dynamically produce a homogeneous mixture of the degradable material solution with between 0.01% (v/v) and 10% (v/v) of the disintegrating agent solution, which is then delivered to the printing heads. The printing of such mixtures results in hydrogel layers that are gradually converted into soft gel or liquid after between 1 hour and 72 hours following the deposition.

In another embodiment of the invention, in cases that the degradable material solution includes degradable polysaccharides (for example, ones having acrylate functional groups) that can be degraded by appropriate enzymes, functioning as the disintegrating agent. Examples for such materials may include acrylated and/or modified polysaccharides, such as starch, cellulose, dextran, chitosan or alginate.

In another embodiment, the degradable material includes reactive polymer-protein hybrid molecules (for example, having acrylate functional groups) that can be degraded by appropriate enzymes, such as trypsin, collagenase or plasmin.

In another embodiment, biosynthetic hydrogel materials can be used for preparing the degradable material solution. Biosynthetic hydrogel materials consist of a protein or a peptide that is conjugated with polymer chains terminated by acrylate end groups. An example of such a material is bovine albumin protein that is modified with PEG-acrylate polymer chains using a widely implemented method called PEGylation. The molecular weight of the PEG-acrylate polymer chains may be between 10,000 and 20,000 gr/mol. Each protein molecule should be modified with between 50 to 100 PEG-acrylate chains. The resulting material, namely PEGylated Albumin Acrylate (PAA), may be used according to this invention for preparation of enzymatically degradable material. According to certain embodiments, the degradable material solution comprises 15-30% of PAA, 65-80% water, 1-4% photoinitiator (for example, without limitation, Irgacure 2959, Ciba) and 1-6% of additives, including viscosity modifiers, rheology modifiers and surfactants, ensuring that the degradable material solution will be compatible with existing deposition systems, such as three dimensional ink jet printing. According to the present invention, the liquid degradable material solution described above is mixed with a concentrated (0.01-10 mg/ml) solution of protease enzyme, such as trypsin or pepsin in water, which acts as the disintegrating agent solution. These enzymes cleave the albumin protein and disintegrate the hydrogel network structure. The mixing ratio (degradable material solution: disintegrating agent solution) is between 10000:1 and 100:1. The optimal ratio depends on the desired degradation rate, as described hereinafter according to the required time or rate of degradation (depending on specific object/printing tray print time, the nature of the degradable material solution, the nature of the disintegrating agent solution, the pH of the disintegrating agent solution, the type of enzyme and its activity, and the like). The mixing ratio may be sampled and determined according to the judgment of one skilled in the art. Generally, the degradation of the material may be measured by pH changes, viscosity changes, mass loss, etc.

In another embodiment, the degradable material contains linear or branched poly(ethylene glycol) (PEG) that is modified with at least two acrylate/methacrylate functional groups and having molecular weight between 1000 to 20000 gr/mol. It is dissolved, for example, in a mixture of water, PEG400 and/or PE600 and/or Glycerol and BYK345 to obtain a formulation that is suitable for ink-jetting. This material is used with a disintegrating agent that is composed of an ink-jet formulation that contains a weak base or a strong base in such concentration that the pH of the degraded media (degradable material or the support material together with disintegrating agent) will be between 13 and 14. At basic pH, the ester bonds of the PEG-acrylate undergo degradation by hydrolysis and the hydrogel stiffness is reduced.

In other embodiments, the degradable material solution is hardened by phase change from liquid to solid or gel or a semisolid form without photopolymerization, i.e., the degradable material solution may comprise a wax. It may further be combined with additional components that undergo photopolymerization to improve the performance of the degradable component and the disintegration thereof.

As mentioned above, the hardening of the degradable material solution into a solid, gel or into a semi solid state and of the object material may be performed by a variety of methods, including UV curing, phase change, drying and crystallization. Any of these methods may cause the inactivation of the disintegrating agent, which, according to this invention, must be overcome. In an embodiment of the invention, when the disintegrating agent is inactivated, for example, by exposure to UV, and/or exposure to the ingredients of the degradable material, such as the photoinitiator, the disintegrating agent solution may further comprise porous nanoparticles for preventing fast mixing of the disintegrating agent with the degradable material solution. In such an embodiment, the disintegrating agent solution comprises a soluble phase and solid or gel porous nanoparticle phase. The concentration of the disintegrating agent in the porous nanoparticles and in the soluble phase may be identical, but only the fraction found in the porous nanoparticles will survive the printing process. Therefore the concentration of the disintegrating agent solution should be calculated accordingly.

In an alternative embodiment, in order to prevent the above described inactivation, the disintegrating agent solution may contain a disintegrating agent that is dispersed in a solvent that is immiscible with the solvent of the degradable material solution.

In an alternative embodiment, in order to prevent the above described inactivation, the disintegrating agent solution may contain reactive components that may cause polymerization or hardening of the disintegrating agent solution. The disintegrating agent solution is then deposited and polymerized at each layer separately from the degradable material solution. In such a way, the disintegrating agent solution can form hydrogel particles that do not mix completely with the degradable material solution and that may release the disintegrating agent gradually by diffusion.

In an alternative embodiment, the disintegrating agent solution contains a disintegrating agent that is encapsulated in smart carrier nanoparticles that are dispersed throughout the degradable material solution prior to the printing process. The disintegrating agent is isolated and does not affect the properties of the material solution. According to certain embodiments, the disintegrating agent is released during the printing process, or after the printing process using a specific trigger, such as heating, microwave irradiation, light irradiation, ultrasound or sonication.

Other proteins and polymers can also be used for preparation of the degradable materials. The selection of the protein and polymer should be based on empirical observations in which the prepared biosynthetic degradable material is crosslinked to form a hydrogel and then immersed in an enzyme solution (with a concentration of about 0.1 mg/ml), i.e., a disintegrating agent solution. The enzyme should be known to be able to cleave each protein in at least one site. If after one week at 37° C. the hydrogel stiffness (i.e. compressive modulus) is reduced at least 100 times, then the protein-polymer combination can be used for synthesis of the degradable material. The appropriate hydrogel composition and enzyme concentration can be determined empirically by mixing the hydrogel precursor solutions with enzyme solutions at different ratios and measuring time required for the hydrogel disintegration.

Figure 4:
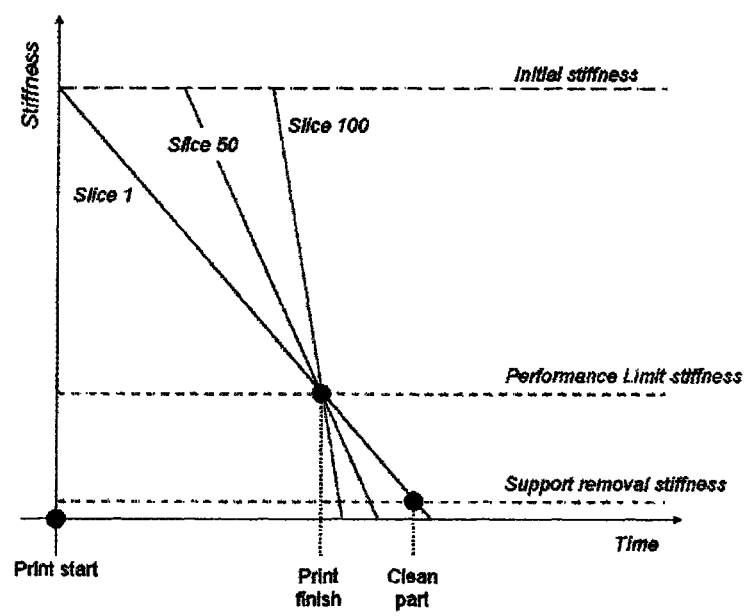
FIG. 4: presents a graph of stiffness vs. time relating to the automated scheduling of degradation.

Reference is now made to FIG. 4, relating to the automated disintegration of the degradable component. For optimal performance, according to certain embodiments, an automatic system can be used to control actual disintegrating agent concentration in each deposited layer (slice). This allows synchronizing the stiffness reduction of different layers and combining acceptable performance during printing with desirable rate of degradation after the printing ends. Such automatic synchronization system includes the following components (as depicted in FIG. 2, relating to a system wherein the disintegrating agent solution and the degradable material solution are mixed before entering the printing head): 1. a cartridge which include a concentrated disintegrating agent solution; 2. a cartridge with the degradable material solution; 3. two computer-controlled liquid pumps that transfer the degradable material solution and the disintegrating agent solution into a dual component mixing chamber; 4. a mixing chamber that receives and homogenizes the degradable material and disintegrating agent solutions and then transfers the mixture into the printing block; 5. a computer program that uses the specific print job data, including tray size, object size and print speed, as well as degradation kinetics data, namely a calibration curve that correlates between disintegrating agent solution concentration and the time that takes for the material to reach its performance limit, to calculate the required disintegrating agent solution concentration. In some embodiments, where the degradable materials is intended to perform as support material, the performance limit is based on minimal stiffness requirements for adequate performance, e.g. support performance, which are determined according to specific depositing technology, but usually require compressive modulus of about 0.3-1.0 MPa. The appropriate disintegrating agent solution concentration should form a material layer with a compression Young modulus at the end of the print job that is about 10% higher than the performance limit value.

The system operation is described in FIG. 4, relating to automated scheduling of degradation. This figure presents an example of printing of tray consisting of 100 slices and containing degradable support structure. The stiffness of the first slice (Slice 1) should remain above the performance limit for the whole print duration, therefore it should contain low enzyme concentration that will reduce its stiffness slowly (moderate slop at the figure). The last slice (Slice 100), on the other hand, does not require a prolonged performance period, and therefore it should contain the highest possible enzyme concentration that will cause a steep reduction of its stiffness over time. The scheduling of degradation will reduce the time from the "print finish" step to "part clean" step, when compared to a constant (consistent) enzyme concentration approach. Moreover, increasing the gap between the support stiffness to the performance limit stiffness will also reduce the support removal time, when using the scheduled degradation approach.

The dynamic modulation of the disintegration agent'concentration, e.g, enzyme concentration in different slices can be achieved also using the Digital Materials concept. The printed pattern that includes areas or phases made of the degradable material and areas or phases made of the disintegrating agent can be modified by automatic software to receive different mixing ratios and result in more convenient degradation kinetics.

According to one embodiment, the degradable material or the support material mechanical properties, including compressive modulus, compressive strength and strain to break can be increased by adding rigid reinforcement. Such reinforcement includes the use of a material that is used for an object formation and usually consists of UV curable material with compressive modulus above 1 GPa. This material can be deposited in such a way that the resulting degradable material or the support material will generally include about 10-30% w/w of rigid regions having side length between 0.2 to 1.0 mm. Different reinforcement geometries can be used for optimal support performance.

According to one embodiment, the above described degradable material can be used not only as a support material, but also as an object material, for example for replacing wax in investment casting, acting as a temporary implant or a drug delivery device.

EXAMPLES

Example 1

Lipase Activity on PCL

Figure 5:
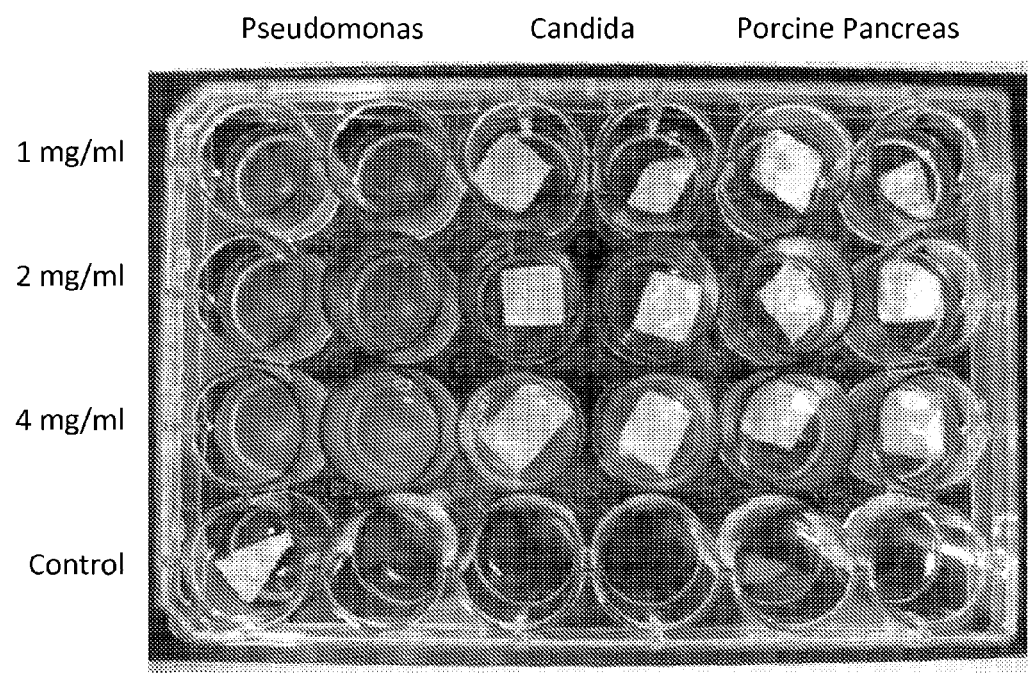
FIG. 5: shows the degradation of PCL specimens added to *Pseudomonas* lipase solutions after two hours of incubation, in comparison to PCL specimens added to candida lipase and porcine pancreas lipase solutions, which did not degrade within two hours.

Electrospun PCL was added to solutions of three lipases derived from *Pseudomonas, Candida* and Porcine pancreas lipases. Each solution comprised 1, 2, or 4 mg/ml of one of the lipases. As shown in FIG. 5, PCL specimens added to *Pseudomonas* lipase solutions were degraded after two hours of incubation, while the two other lipases did not degrade the PCL.

Example 2

Triblock Polymer Solution Viscosities

As demonstrated in FIG. 6, triblock polymers PCL-PEG-PCL were synthesized from PEGs of various lengths and ε-Caprolactone, in the presence of Stannous 2-Ethyl-Hexanoate. After synthesis, sample molecular structures were analyzed by NMR.

Three triblock polymer species were synthesized:
1. PEG 4000Da: $PCL_{1000Da}PEG_{4000Da}PCL_{1000Da}$
2. PEG 6000Da: $PCL_{1000Da}PEG_{6000Da}PCL_{1000Da}$
3. PEG10000Da: $PCL_{1000Da}PEG_{10000Da}PCL_{1000Da}$ Viscosities were measured in 20% polymer solutions in water, each comprising one of the above three polymers, as a function of shear rate at 25° C. The results are shown in FIG. 7.

Figure 7:
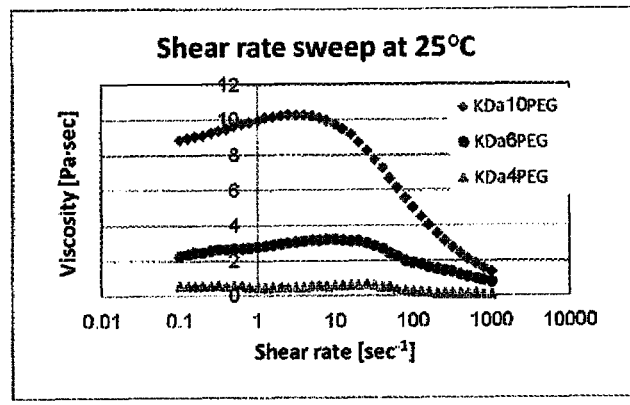
FIG. 7: shows the shear rate sweep tests of three different polymer solutions at 25° C.

The results shown in FIG. 7 teach that a triblock solution is a shear thinning non-newtonian fluid. Further, the solution viscosity is highly dependent on polymer length, where longer polymer chains cause an increase in viscosity.

Figure 8A:
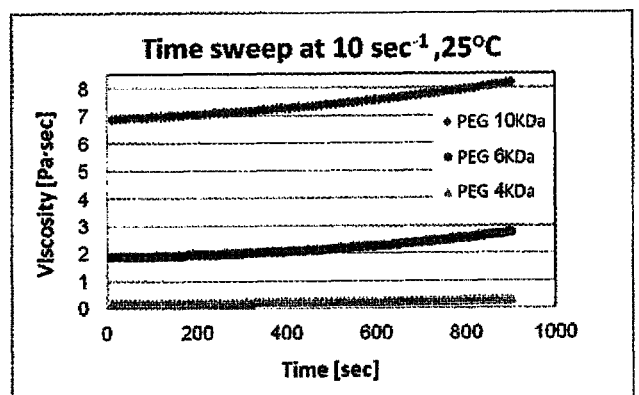
FIG. 8a: shows the time sweep tests at a temperature of 25° C. at a shear rate of 10sec-1 of three different polymer solutions.
Figure 8B:
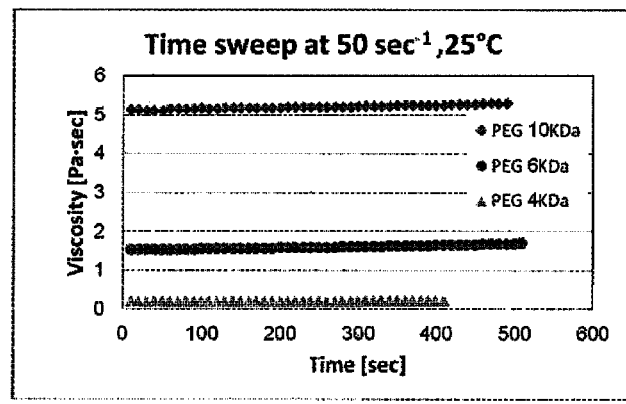
FIG. 8b: shows the time sweep tests at a temperature of 25° C. at a shear rate of 50sec-1 of three different polymer solutions.
Figure 8C:
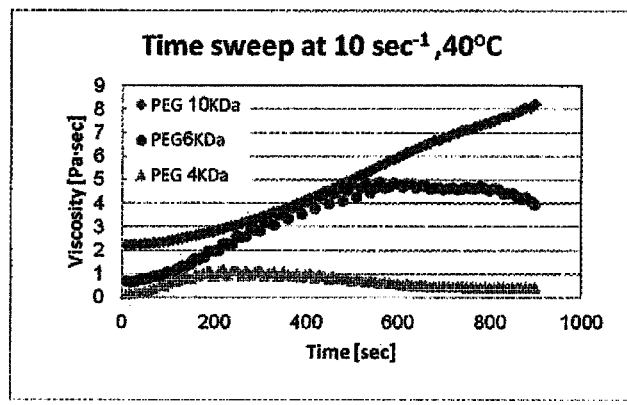
FIG. 8c: shows the time sweep tests at a temperature of 40° C. at a shear rate of $10\text{sec}^{-1}$ of three different polymer solutions.

Time sweep tests were performed at 25° C. at shear rates of 10sec-1 and 50sec-1 and at 40° C., 10sec-1. These time sweeps are shown in FIGS. 8a, 8b and 8c, respectively.

The initial viscosity values of the three 20% solutions are given in Table I below:

TABLE I

| | Triblock with PEG 10000Da | Tri-block with PEG 6000Da | Tri-block with PEG 4000Da |
|---|---|---|---|
| $\dot{\gamma} = 10\ sec^{-1}$, $v_{max} = 5$ mm/sec. T = 25° C. | 6.9 [Pa · sec] | 1.9 [Pa · sec] | 0.19 [Pa · sec] |
| $\dot{\gamma} = 50\ sec^{-1}$, $v_{max} = 25$ mm/sec T = 25° C. | 5.1 [Pa · sec] | 1.5 [Pa · sec] | 0.19 [Pa · sec] |
| $\dot{\gamma} = 10\ sec^{-1}$, $v_{max} = 5$ mm/sec T = 40° C. | 2.2 [Pa · sec] | 0.7 [Pa · sec] | 0.17 [Pa · sec] |

The viscosity measurements detailed above and presented in FIGS. 7, 8a, 8b and 8c and Table I, teach that the triblock solution is non-newtonian, changing its internal organization under shear stress, which results in an increase in the viscosity with time. Higher shear rate results in lower viscosity due to the shear thinning nature of the solution. Further, as shown in Table I, the initial viscosity values are temperature dependent, decreasing with temperature.

Acrylated Triblock Polymer Solution Viscosities

The viscosity of acrylated triblock polymers was compared to that of the same triblock polymers prior to acrylation.

Three block copolymers where used:
1. acrylated $PCL_{1000Da}PEG_{4000Da}PCL_{1000Da}$
2. acrylated $PCL_{500Da}PEG_{4000Da}PCL_{500Da}$
3. acrylated $PCL_{750Da}PEG_{1500Da}PCL_{750Da}$ It was found that a solution of acrylated $PCL_{1000Da}PEG_{4000Da}PCL_{1000Da}$ was significantly more viscous than the triblock polymer prior to acrylation. This may be due to loss of hydroxide groups at the edges of the molecule and resulting increase in hydrophobic interactions. The viscosities of $PCL_{1000Da}PEG_{4000Da}PCL_{1000Da}$ after and before acrylation (compared to support material), are shown in FIGS. 11a and 11b respectively.

Figure 11A:
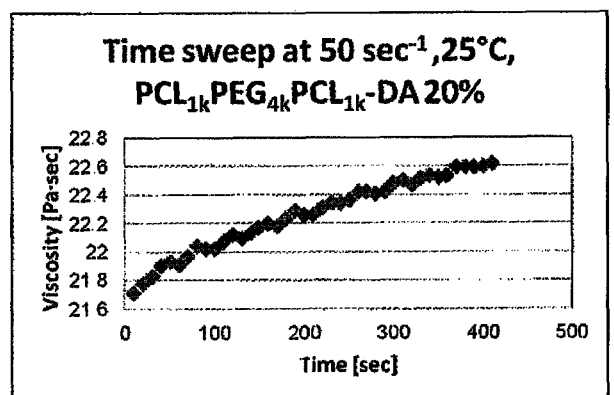
FIG. 11a: shows the viscosities of $PCL_{1000Da}PEG_{4000Da}PCL_{1000Da}$ after acrylation compared to support material.
Figure 11B:
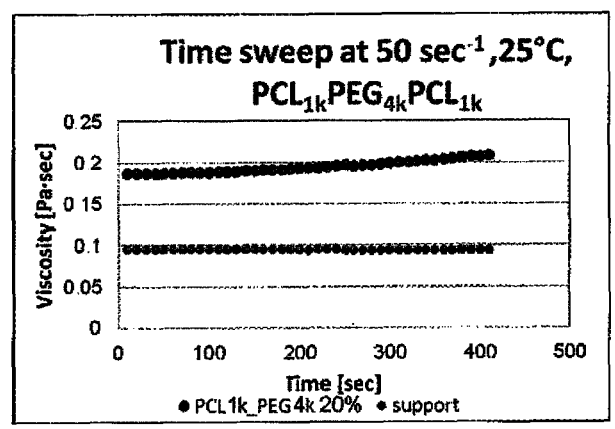
FIG. 11b: shows the viscosities of $PCL_{1000Da}PEG_{4000Da}PCL_{1000Da}$ before acrylation compared to support material.

As seen in FIG. 11a, the viscosity of acrylated $PCL_{1000Da}PEG_{4000Da}PCL^{1000Da}$ was too high for use as main degradable copolymer according to this invention.

The viscosity of $PCL_{500Da}PEG_{4000Da}PCL_{500Da}$ which has shorter PCL fragments, and as a result is less hydrophobic.

$PCL_{750Da}PEG_{1500Da}PCL_{750Da}$—this triblock has shorter PEG fragments, to reduce entanglement. The PCL fragments were also shortened in order to allow dissolution in water.

Figure 12A:
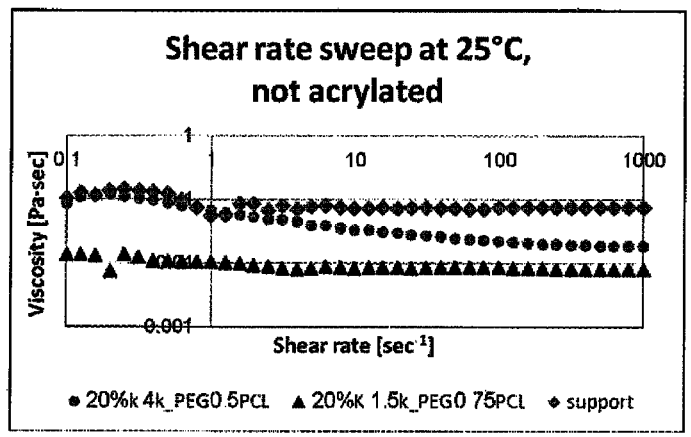
FIG. 12a: shows the shear rate sweep test of 20% solutions of $PCL_{500Da}PEG_{4000Da}PCL_{500Da}$ and $PCL_{750Da}PEG_{1500Da}PCL_{750Da}$ before acrylation.
Figure 12B:
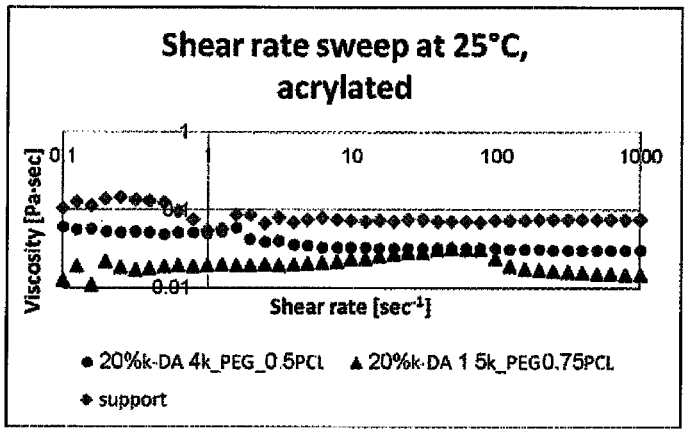
FIG. 12b: shows the shear rate sweep test of 20% solutions of $PCL_{500Da}PEG_{4000Da}PCL_{500Da}$ and $PCL_{750Da}PEG_{1500Da}PCL_{750Da}$ after acrylation.
Figure 13A:
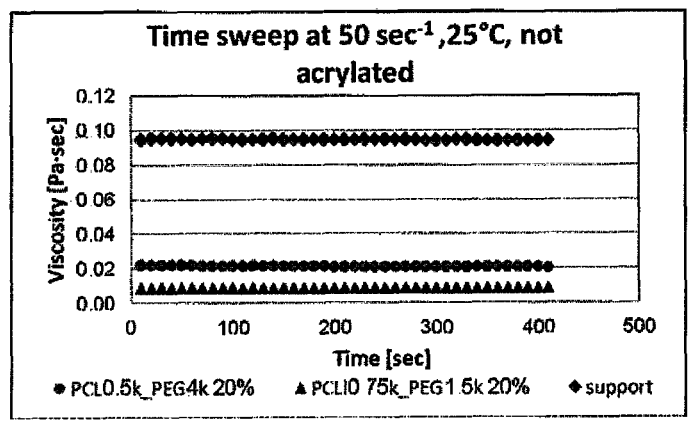
FIG. 13a: shows the time sweep test of 20% solutions of $PCL_{500Da}PEG_{4000Da}PCL_{500Da}$ and $PCL_{750Da}PEG_{1500Da}PCL_{750Da}$, compared to the support, before acrylation at 25° C.
Figure 13B:
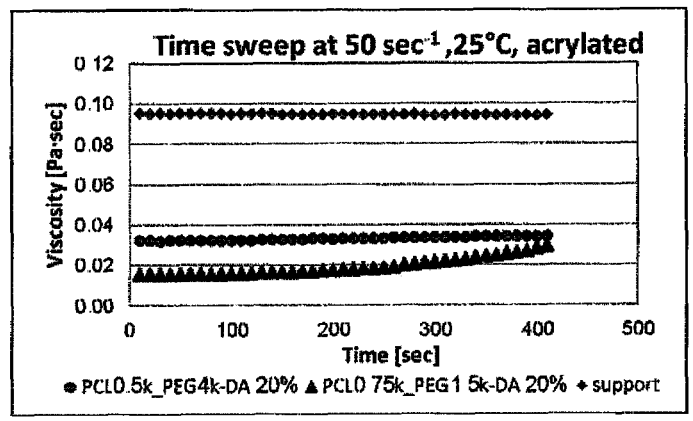
FIG. 13b: shows the time sweep test of 20% solutions of $PCL_{500Da}PEG_{4000Da}PCL_{500Da}$ and $PCL_{750Da}PEG_{1500Da}PCL_{750Da}$, compared to the support, after acrylation at 25° C.
Figure 13C:
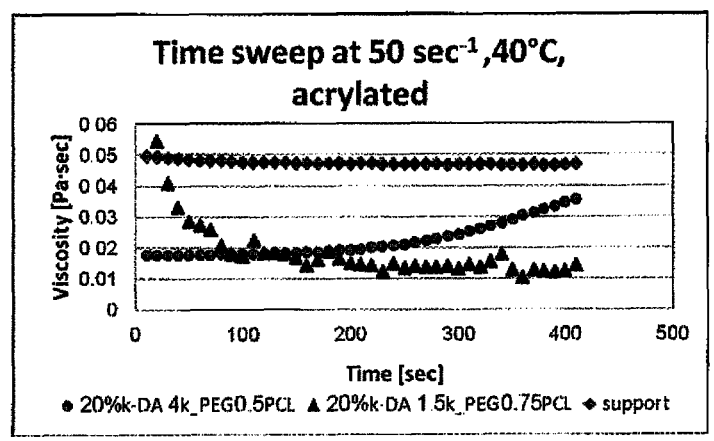
FIG. 13c: shows the time sweep test of 20% solutions of $PCL_{500Da}PEG_{4000Da}PCL_{500Da}$ and $PCL_{750Da}PEG_{1500Da}PCL_{750Da}$, compared to the support, after acrylation at 40° C.

The viscosities of 20% solutions of the above last two polymers were measured as a function of shear rate, before and after acrylation. The results of these measurements are shown in FIGS. 12a and 12b. Further, the time sweep tests of the same solutions were compared to those of the support at 25° C. (before and after acrylation) and at 40° C. (after acrylation) at a shear rate of 50sec-1. The results of the time sweeps are shown in FIGS. 13a, 13b and 13c.

As shown in the above figures, both of these triblocks are less viscous than the support material at room temperature. The acrylation effect on viscosity is less significant than in $PCL_{1000Da}PEG_{4000Da}PCL_{1000Da}$, and $PCL_{750Da}PEG_{1500Da}PCL_{750Da}$ is less viscous than $PCL_{500Da}PEG_{4000Da}PCL_{500Da}$, however, it is not Newtonian.

The initial viscosity values of the support of several solutions are given in Table II below:

TABLE II

| | 25° C. | 40° C. |
|---|---|---|
| Support | 95 | 49 |
| PEG-DA 10000Da 20% | 16 | 11 |
| $PCL_{1000Da}PEG_{4000Da}PCL_{1000Da}$ 10% | 78 | 112 |
| $PCL_{1000Da}PEG_{4000Da}PCL_{1000Da}$ 20% | 21800 | |
| $PCL_{500Da}PEG_{4000Da}PCL_{500Da}$ 30% | 127 | 65 |
| $PCL_{500Da}PEG_{4000Da}PCL_{500Da}$ 20% | 32 | 18 |
| $PCL_{500Da}PEG_{4000Da}PCL_{500Da}$ 15% | 10 | 6 |
| $PCL_{750Da}PEG_{1500Da}PCL_{750Da}$ 30% | 672 | 1800 |
| $PCL_{750Da}PEG_{1500Da}PCL_{750Da}$ 20% | 16 | Value not stable near t = 0, reaches 14 |

As seen in Table II, both of the new acrylated triblocks have low enough initial viscosity values at 20% solutions, wherein the upper viscosity limit was defined as 18 cP.

Example 3

Triblock Degradation by Lipase

The degradation of the triblocks, prepared according to Example 2 (PCL added to PEG4000Da, PEG6000Da and PEG10000Da), was monitored in two ways: 1) by measuring pH change with time after lipase addition; and 2) by measuring the change in viscosity with time.

PCL monomers are acids, and therefore, as the PCL polymers degrade, the pH of the solution is expected to drop. Additionally, the solution viscosity is expected to decrease with degradation, since the length of the polymers becomes shorter.

The following experiments were conducted with the lipase enzyme extracted from *Pseudomonas* cepacia (Sigma 62309, BioChemika, powder, light beige, ~50 units/mg).

Change in pH During Degradation

10% solutions of the three triblock polymers in water were degraded by the addition of 0.5 mg/ml of the lipase. The pH change of the solutions was monitored both by addition of phenol red (red in neutral solutions and yellow in acidic solutions) and by using a pH-meter.

The measurements showed that there is a significant pH decrease immediately after lipase addition, which continues with time. This is evidence of triblock degradation by the enzyme. Further, differences in the degradation kinetics of the three polymer types were not evident in the pH tests.

Change in Viscosity During Degradation

Figure 9:
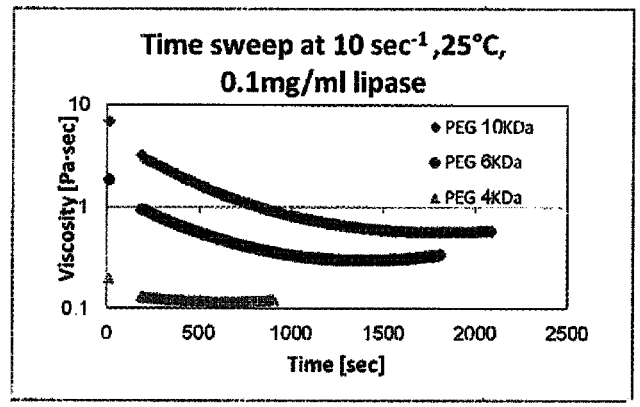
FIG. 9: shows the time sweep tests of three different polymer solutions at a temperature of 25° C. at a shear rate of $10\text{sec}^{-1}$, after the addition of 0.1 mg/ml lipase.

A change in the triblock solution viscosity with time was measured at shear rate of 10 sec-1, after addition of 0.1 mg/ml lipase. The results are shown in FIG. 9. As evident in FIG. 9, there is a time delay, which results from mixing and experiment preparation. Further, the initial point was measured by testing the solutions at the same temperature and shear rate, though with no lipase addition.

Figure 10:
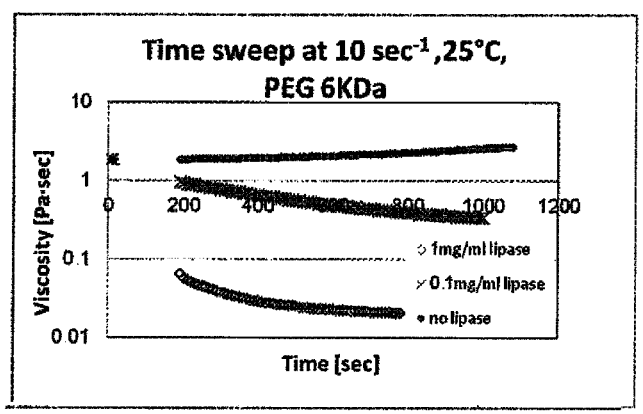
FIG. 10: shows the viscosity variation of $PEG_{6000Da}$ triblock after the addition of various lipase doses, specifically, no lipase, 0.1 mg/ml lipase and 1.0 mg/ml lipase.

FIG. 10 shows the viscosity variation of PEG 6000Da triblock after the addition of various lipase doses, specifically, no lipase, 0.1 mg/ml lipase and 1.0 mg/ml lipase.

As evident from FIG. 9, there is a difference between the three triblocks in degradation kinetics. The triblock with the shortest PEG is the one with the fastest degradation due to higher PCL percentage. Further, as evident from FIG. 10, the degradation kinetics is dose dependant, allowing controlling of degradation time by lipase concentration variation.

Example 4

Hydrogels

Mechanical Properties

Hydrogels were prepared from the acrylated tri-block solutions detailed in Example 2 by exposure of the solutions to UV radiation. The compression moduli of the hydrogels, obtained from Instron® measurements and G' values obtained from rheology are provided in Table III below.

TABLE III

| | Compression modulus [KPa] | G' [KPa] |
|---|---|---|
| FullCure ® 705 | 328 ± 41 | 107 |
| PEG 20000Da 30% | 188 ± 19 KPa | |
| PEG 10000Da 30% | 295 ± 27 KPa | |
| PEG 10000Da 20% | 154 ± 10 KPa | 54 |
| $PCL_{1000Da}PEG_{4000Da}PCL_{1000Da}$ 10% | 20 ± 2 KPa | 5.8 |
| $PCL_{500Da}PEG_{4000Da}PCL_{500Da}$ 30% | Was not measured, since the modulus was above the instrument limit, i.e., | Was not measured, since the modulus was above the instrument limit, i.e., |

TABLE III-continued

| | Compression modulus [KPa] | G' [KPa] |
|---|---|---|
| | higher than 328KPa. | higher than 328KPa. |
| $PCL_{500Da}PEG_{4000Da}PCL_{500Da}$ 20% | 294 ± 11 KPa | 112 |
| $PCL_{500Da}PEG_{4000Da}PCL_{500Da}$ 15% | | 48 |
| $PCL_{750Da}PEG_{1500Da}PCL_{750Da}$ 30% | 234 ± 20 KPa | 105 |
| $PCL_{750Da}PEG_{1500Da}PCL_{750Da}$ 20% | 76 ± 3 KPa | 26 |

As shown in Table III, gels formed after crosslinking of $PCL_{500Da}PEG_{4000Da}PCL_{500Da}$ 20% and $PCL_{750Da}PEG_{1500Da}PCL_{750Da}$ 30% have stiffness comparable to FullCure® 705 support material. However, as can be seen in Table II, the viscosity of $PCL_{750Da}PEG_{1500Da}PCL_{750Da}$ 30% is too high, i.e., above 18 cP, set in this example as the upper viscosity limit.

Curing Kinetics at 5 mW/cm

Curing times for various hydrogels that may be used for printing in comparison to FullCure® 705, and related to herein as the "support" are provided in Table IV below. Curing time was taken as the time needed to reach 90% of maximum G' value.

TABLE IV

| | Curing time [sec] |
|---|---|
| Support | 44 |
| PEG 20000Da 20% | 191 |
| PEG 10000Da 20% | 197 |
| $PCL_{1000Da}PEG_{4000Da}PCL_{1000Da}$ 10% | 121 |
| $PCL_{500Da}PEG_{4000Da}PCL_{500Da}$ 20% | 158 |
| $PCL_{500Da}PEG_{4000Da}PCL_{500Da}$ 15% | 170 |
| $PCL_{750Da}PEG_{1500Da}PCL_{750Da}$ 30% | 164 |
| $PCL_{750Da}PEG_{1500Da}PCL_{750Da}$ 20% | 136 |

Curing times for the hydrogels are long, compared to the support; however they may be shortened by increasing their photo-initiator concentration or UV intensity.

Hydrogel Degradation by Lipase

The hydrogels listed in Table V, were degraded in solutions containing lipase. Degradation took about 12 hours. It was found that only $PCL_{750Da}PEG_{1500Da}PCL_{750Da}$ and $PCL_{1000Da}PEG_{4000Da}PCL^{1000Da}$ were degraded by the lipase.

Mass Loss During Curing

Mass loss, which is defined as the difference between the solution weight before the polymerization and the hydrogel weight after polymerization, after the excess of liquids was removed, used to measure the gel contraction during the polymerization, is shown in Table V. No connection between hydrophobicity and mass loss is evident, teaching that mass loss is mostly dependent on curing conditions.

Table V

| | Mass loss during curing % |
|---|---|
| $PCL_{1000Da}PEG_{4000Da}PCL_{1000Da}$ 10% | 16 |
| $PCL_{500Da}PEG_{4000Da}PCL_{500Da}$ 15% | 18 |
| $PCL_{750Da}PEG_{1500Da}PCL_{750Da}$ 20% | 12 |
| PEG 10000Da 20% | 20 |

What is claimed is:

1. A three dimensional printing method for producing a self-destructible temporary structure, comprising:
   depositing a degradable material solution comprising a degradable component;
   depositing a disintegrating agent solution comprising a disintegrating agent capable of disintegrating the degradable component;
   solidifying a combined disintegrating agent and degradable material solution to form a solid, semi solid or gel layer; and
   repeating said steps of depositing and solidifying layers until the self-destructible temporary structure is formed, wherein after solidification, the disintegrating agent gradually degrades the degradable component to disintegrate the self-destructible temporary structure.

2. The method of claim 1 wherein depositing the degradable material solution and the disintegrating agent solution is done by one or more inkjet printing heads.

3. The method of claim 1, wherein the disintegrating agent solution and the degradable material solution are combined immediately before deposition.

4. The method of claim 1, wherein a combination of the disintegrating agent solution and the degradable material solution occurs after deposition, within a deposited layer.

5. The method of claim 1, wherein the disintegrating agent is an enzyme, catalyst, acid or a base.

6. The method of claim 5, wherein the enzyme is an esterase, a trypsin, a collagenase, a cellulase or a dextranase.

7. The method of claim 1, wherein the disintegrating agent is in an isolated state and wherein the disintegrating agent is released and activated during or after deposition of a three-dimensional printing process by an external trigger.

8. The method of claim 1, wherein the degradable component is a photopolymer, a wax or a combination thereof.

9. The method of claim 1, wherein the degradable component is a polymer.

10. The method of claim 9, wherein said polymer is a copolymer, a block-copolymer, a photopolymer, a polysaccharide, reactive polymer-protein hybrid molecules, a biosynthetic hydrogel material or a wax.

11. The method of claim 10, wherein said copolymer comprises polyethyleneglycol (PEG) or poly(acrylic acid) or poly(hyaluronic acid) or polycaprolactone or poly(vinyl alcohol).

12. The method of claim 1, wherein the degradable material solution further comprises any one of a reactive solvent, a non-reactive solvent, a surfactant, a photoinitiator, a viscosity modifier, a rheology modifier or any combination thereof.

13. The method of claim 1, wherein the disintegrating agent solution further comprises any one of a reactive solvent, a non-reactive solvent, a surfactant, a photoinitiator, porous nanoparticles, a viscosity modifier, a rheology modifier or any combination thereof.

14. The method of claim 1, wherein the disintegrating agent decomposes at least one chemical bond or at least one physical bond within the degradable component.

15. The three dimensional printing method of claim 1, wherein combination of the disintegrating agent solution and the degradable material solution is controlled by a dedicated software so that the volumetric ratio between the degradable material solution and disintegrating agent solution can be modulated during printing.

16. The three dimensional printing method of claim 1, wherein the disintegrating agent solution comprises a liquid phase that is insoluble in the degradable material solution.

17. The three dimensional printing method of claim 1, wherein the disintegrating agent solution comprises a solid or gel phase that is insoluble in the degradable material solution.

18. The three dimensional printing method of claim 1, wherein the disintegrating agent solution comprises nanoparticles filled with the disintegrating agent and the disintegrating agent is released by an external trigger.

19. The method of claim 1 comprising:
   controlling disintegrating agent concentration of the disintegrating agent in each deposited layer based on desirable rates of degradation for each of the deposited layers, wherein the disintegrating agent concentration within a first deposited layer is lower than the disintegrating agent concentration in an upper deposited layer.

20. The method of claim 1, wherein the self-destructible temporary structure provides support for a three-dimensional object during building of the three-dimensional object by a three-dimensional inkjet printing system.

* * * * *